Nov. 21, 1950     M. W. SHIPPEY     2,531,081
POWER MOWER GRASS RAISER
Filed Aug. 20, 1949
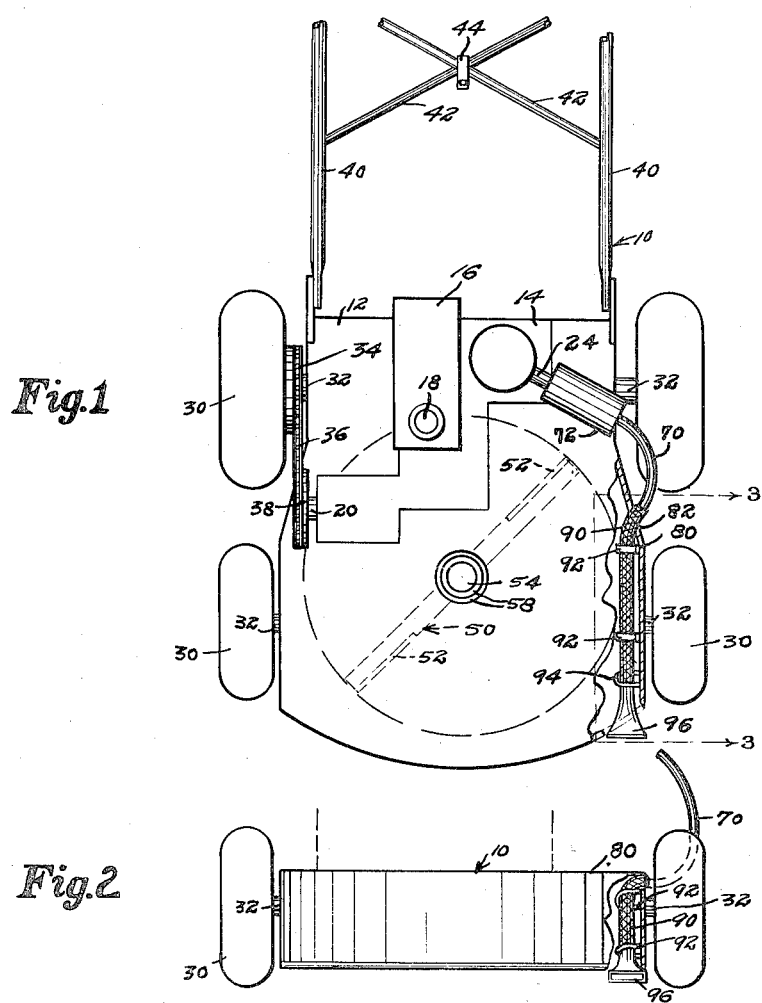
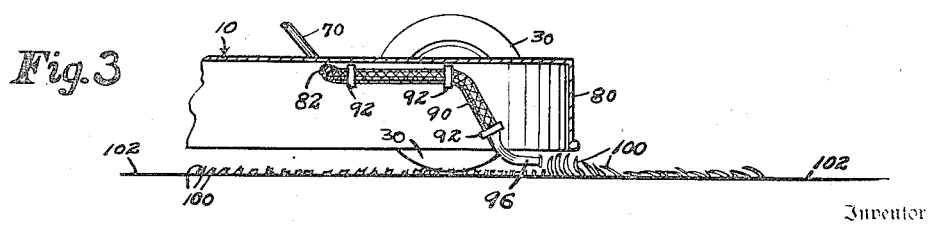

Patented Nov. 21, 1950

2,531,081

UNITED STATES PATENT OFFICE 2,531,081

POWER MOWER GRASS RAISER

Melvin William Shippey, Tabor, Iowa

Application August 20, 1949, Serial No. 111,381

3 Claims. (Cl. 56—25.4)

This invention relates to power mowers and it is an object of this invention to provide means for conducting exhaust gases from the motor of such a mower and delivering the same forwardly of the mower for raising bent over grasses preparatory to their being cut.

It is well known that power motors of the type having horizontally rotating blades have a disadvantage in that the wheels of the mower bend grass over during a trip across a lawn making it very difficult for the blade to catch and cut the bent over grass during a subsequent trip across the lawn.

It is, therefore, an object of this invention to provide a hose secured to the exhaust of a power mower and extending forwardly of the mower to a position for bending upwardly bent over grass blades.

A further object of the invention is to provide a device as described including means for directing the gases over a wide area.

Still a further object of the invention is to provide a device as described including means for insulating the hose from adjacent portions of the mower.

A particular object of this invention is to provide means for directing exhaust gases away from the face of the operator to eliminate one of the most undesirable features of propeller mowers now on the market.

Yet a further object of the invention resides in the provision of a device as described which may be attached either to the exhaust port of the motor or to a muffler, the muffler being secured to the exhaust port of the motor.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

In the drawings:

Figure 1 is a top plan view of a power mower shown with upper end portions of its handle removed together with a forward portion of the housing of the mower, the mower being shown with the grass raising device of this invention secured thereto, the power mower blade and its swath being indicated in dotted lines;

Figure 2 is a frontal elevation of forward portions of the power mower as shown in Figure 1, rearward portions of the mower and concealed portions of the hose of this invention being shown in dotted lines; and Figure 3 is a view-in-section taken along the line 3—3 of Figure 1.

The grass raising device of this invention is for attachment to a power mower and is especially useful with power mowers of the type having horizontally rotating blades. Such a mower is generally indicated at 10 in Figures 1 to 3.

The power mower 10 is provided with a platform 12 having a motor 14 mounted thereon. The motor 14 is provided with a gas tank 16 having a cap 18, a drive shaft 20 and a pipe 24 providing an exhaust gas outlet port from the motor.

The mower has four wheels 30 mounted on axles 32, one of the latter being provided with a sprocket wheel 34 around which a sprocket chain 36 is disposed for drivably securing the wheel 34 to a sprocket wheel 38 which latter is secured to the drive shaft 20 of the motor 14.

The power mower further includes two upwardly extending handle braces 40 which are rigidly secured together by two criss-cross braces 42 held together by clamps 44. The upper handle portions of the power mower are not shown in the drawings.

The mower further includes a cutting blade shown in dotted lines at 50 having cutting edges 52. The blade 50 is pivotally secured to a shaft 54 mounted in bearings 58. The shaft 54 is drivably secured to the motor 14 by means not shown.

The foregoing is old and conventional in the art. The device of this invention will now be described.

Such device includes a hose or pipe 70 which latter is secured at one end either to the outlet port 24 or to a muffler 72 which latter is itself secured to the outlet port 24. The hose or conduit 70 extends outwardly and downwardly toward the left-hand front wheel and enters through a housing 80 of the mower through an aperture 82.

The hose or conduit 70 is very hot because of the exhaust gases traveling therethrough. Consequently, that portion of the hose or conduit 70 which passes under the housing 80 is provided with insulation 90 surrounding itself. The hose 70 and insulation 90 are suitably secured to the housing 80 on its inner side wall by means of brackets 92 and 94. The forward end of the hose or conduit 70 is disposed in communication with the spreading head or nozzle 96.

The spreading head 96 is outwardly flared from its rearward to its forward end for distributing exhaust gases over a wider area, the forward end of the fitting 96 being wider transversely of the direction of travel of the machine than the rearward end thereof.

It is preferable that the fitting 96 be disposed for directing gases forwardly of the power mower and at a point adjacent the perimeter of the swath of the blade 50, but inside the line of travel of the adjacent wheel.

It will be seen that if desired two hoses could be employed for distributing gases to either side of the mower. Also it will be seen that in mowing grass that is bent downwardly over its entire area it may be desirable to provide a distributing head 96 which is adapted to distribute exhaust gases over the entire front of the swath of the blade 50.

The fitting 96 is disposed beneath the housing 80 where it can most effectively blow against and raise the grass blades 100 from the ground in front of the swath of the blade 50.

This invention has provided means for eliminating the uneven mowing of power mowers by eliminating the poorly cut ridges of grass which normally result from the bending down of grass being cut by the wheels of a mower on a previous cutting trip; and has further provided means for conducting the exhaust gases of a power mower away from the face of an operator, whereby power mowing is more healthful and pleasant than heretofore.

From the foregoing description it is thought to be obvious that a power mower grass raiser constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a mowing machine, the combination which comprises a horizontally disposed platform, a motor having an exhaust outlet port thereon mounted on said platform, wheels on which the platform is mounted, a horizontally disposed rotary cutting blade journaled in said platform and operatively connected to the motor, an exhaust pipe extended from the exhaust outlet port of the motor to a point adjacent the forward edge of the periphery of a circle described by the cutting blade, and a flat nozzle having an elongated horizontally disposed slot therein carried by the forward end of the said exhaust pipe and positioned to be spaced slightly above the surface of the ground upon which the mower is positioned and to discharge exhaust gases ahead of the cutting blade.

2. In a mowing machine, the combination which comprises a horizontally disposed platform, a motor having an exhaust outlet port thereon mounted on said platform, wheels on which the platform is mounted, a horizontally disposed rotary cutting blade journaled in the platform and operatively connected to the motor, an exhaust pipe extended from the exhaust outlet port of the motor to a point adjacent the forward edge of the periphery of a circle described by the cutting blade, a housing carried by the platform and through which the said exhaust pipe extends, a sleeve of insulating material positioned around the portion of the pipe extended through the housing, and a flat nozzle having an elongated horizontally disposed slot therein carried by the forward end of the said exhaust pipe and positioned to be spaced slightly above the surface of the ground upon which the mower is positioned and also positioned to discharge exhaust gases into the grass ahead of the cutting blade.

3. In a mowing machine, the combination which comprises a horizontally disposed platform, a motor having an exhaust outlet port thereon mounted on the platform, wheels on which the platform is mounted, a horizontally disposed rotary cutting blade journaled in the platform and operatively connected to the motor, said blade spaced slightly above the surface of ground upon which the mowing machine is positioned, a flat nozzle having an elongated horizontally disposed slot therein positioned adjacent the forward edge of the periphery of a circle described by the cutting blade whereby exhaust gases discharged therefrom are directed against grass on the ground ahead of the cutting blade, and means connecting the nozzle to the exhaust outlet port of the motor.

MELVIN WILLIAM SHIPPEY.

REFERENCES CITED

The following references are of record in the file of this patent:

UNITED STATES PATENTS

| Number | Name | Date |
| --- | --- | --- |
| 835,146 | Walker et al. | Nov. 6, 1906 |
| 857,084 | Lull | June 18, 1907 |
| 2,176,175 | George et al. | Oct. 17, 1939 |
| 2,232,671 | Loder | Feb. 18, 1941 |
| 2,504,416 | Hileman | Apr. 18, 1950 |